US011152623B2

(12) United States Patent
Takahashi et al.

(10) Patent No.: US 11,152,623 B2
(45) Date of Patent: Oct. 19, 2021

(54) BINDER COMPOSITION FOR SECONDARY BATTERY, CONDUCTIVE MATERIAL PASTE FOR SECONDARY BATTERY ELECTRODE, SLURRY COMPOSITION FOR SECONDARY BATTERY ELECTRODE, METHOD OF PRODUCING SLURRY COMPOSITION FOR SECONDARY BATTERY ELECTRODE, ELECTRODE FOR SECONDARY BATTERY, AND SECONDARY BATTERY

(71) Applicant: ZEON CORPORATION, Tokyo (JP)

(72) Inventors: Naoki Takahashi, Tokyo (JP); Tomoya Murase, Tokyo (JP); Shinsuke Sugawara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/979,520

(22) PCT Filed: Mar. 18, 2019

(86) PCT No.: PCT/JP2019/011242
§ 371 (c)(1),
(2) Date: Sep. 10, 2020

(87) PCT Pub. No.: WO2019/181870
PCT Pub. Date: Sep. 26, 2019

(65) Prior Publication Data
US 2020/0411874 A1    Dec. 31, 2020

(30) Foreign Application Priority Data
Mar. 23, 2018 (JP) ............... JP2018-056999

(51) Int. Cl.
| | | |
|---|---|---|
| H01B 1/24 | (2006.01) | |
| H01M 4/00 | (2006.01) | |
| H01M 4/62 | (2006.01) | |
| C08F 212/10 | (2006.01) | |
| C08F 220/46 | (2006.01) | |
| H01M 4/139 | (2010.01) | |
| H01M 10/0525 | (2010.01) | |

(52) U.S. Cl.
CPC ........... *H01M 4/622* (2013.01); *C08F 212/10* (2013.01); *C08F 220/46* (2013.01); *H01B 1/24* (2013.01); *H01M 4/139* (2013.01); *H01M 4/625* (2013.01); *H01M 10/0525* (2013.01); *C08F 2800/20* (2013.01)

(58) Field of Classification Search
CPC .. H01B 1/00; H01B 1/24; H01M 4/02; H01M 4/04; H01M 4/13; H01M 4/139; H01M 4/622; C09D 5/24
See application file for complete search history.

(56) References Cited

U.S. PATENT DOCUMENTS

| | | | | |
|---|---|---|---|---|
| 2008/0318005 A1* | 12/2008 | Millward | .................. | G03F 7/40 428/172 |
| 2016/0122549 A1* | 5/2016 | Keoshkerian | ............. | C09C 1/56 524/546 |
| 2021/0005894 A1* | 1/2021 | Murase | .................. | H01M 4/04 |

FOREIGN PATENT DOCUMENTS

| | | | |
|---|---|---|---|
| CN | 100457832 C | * | 2/2009 |
| JP | H11288720 A | | 10/1999 |
| JP | 2012204303 A | | 10/2012 |
| JP | 2013179040 A | | 9/2013 |

OTHER PUBLICATIONS

Abbasian et al "Synthesis and characterization of amphiphilic methoxypoly(ethylene glycol)-polystyrene diblock copolymer by ATRP and NMRP techniques", Journal of Elastomers and Plastics 44(2), 205-220 (2012).*
Bonilla-Cruz et al "Amphiphilic block copolymer from hydroxyl-terminated polymers functionalized with TEMPO. A new synthetic method using oxoammonium salt", Macromolecular Chemistry and Physics, 2011, 212, 1654-1662.*
Catalgil-Giz et al "Block copolymer synthesis and chain extension from TEMPO-terminated chains formed by ultrasonic chain scission", Journal of Applied Polymer Science, vol. 77, 1950-1953 (2000).*
Lee et al "Novel amphiphilic carbon black composite nanoparticles from TEMPO-terminated polymer and TEMPO-terminated block copolymer grafted carbon black", Polymer 46 (2005) 5514-5523.*
Sep. 29, 2020, International Preliminary Report on Patentability issued in the International Patent Application No. PCT/JP2019/011242.

* cited by examiner

*Primary Examiner* — Mark Kopec
(74) *Attorney, Agent, or Firm* — Kenja IP Law PC

(57) ABSTRACT

A binder composition for a secondary battery including a polymer having a structure represented by the following formula (I) at a terminal thereof; and a solvent,

[Formula 1]

$$\ast\!-\!\overset{\overset{\displaystyle H}{|}}{\underset{\underset{\displaystyle H}{|}}{C}}\!-\!O\!-\!N\overset{\displaystyle R^1}{\underset{\displaystyle R^2}{\diagdown}} \quad (I)$$

[in Formula (I), $R^1$ and $R^2$ each independently represents an organic group or an organic group in which $R^1$ and $R^2$ together form a ring, and * represents a binding site to the terminal of a main chain of the polymer].

11 Claims, No Drawings

BINDER COMPOSITION FOR SECONDARY BATTERY, CONDUCTIVE MATERIAL PASTE FOR SECONDARY BATTERY ELECTRODE, SLURRY COMPOSITION FOR SECONDARY BATTERY ELECTRODE, METHOD OF PRODUCING SLURRY COMPOSITION FOR SECONDARY BATTERY ELECTRODE, ELECTRODE FOR SECONDARY BATTERY, AND SECONDARY BATTERY

TECHNICAL FIELD

The present disclosure relates to a binder composition for a secondary battery, a conductive material paste for a secondary battery electrode, a slurry composition for a secondary battery electrode, a method of producing a slurry composition for a secondary battery electrode, an electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. Thus, battery members, such as electrodes, are studied and improved these days to further enhance the performance of the secondary batteries.

An electrode for a secondary battery, such as a lithium ion secondary battery, typically includes a current collector and an electrode mixed material layer formed on the current collector. This electrode mixed material layer is formed by, for example, applying a slurry composition containing an electrode active material, a binder-containing binder composition, and so forth onto the current collector, and then drying the applied slurry composition.

In order to further improve the performance of secondary batteries, attempts have been made in recent years to improve binder compositions used in formation of electrode mixed material layers.

Specifically, for example, PTL 1 discloses production of an electrode for a lithium ion secondary battery that maintains a good electric capacity by using a binder composition for a lithium ion secondary battery prepared by dispersing a polymer into an organic dispersion medium, wherein the difference between the solubility parameter (SP value) of the polymer and the SP value of the organic dispersion medium is in a range of 1 to 10 $(cal/cm^3)^{1/2}$.

Further, PTL 2 discloses a binder containing a nitrile group-containing polymerization unit, an aromatic vinyl polymerization unit, a hydrophilic group-containing polymerization unit, and a linear alkylene polymerization unit having a carbon number of at least 4, wherein the percentage content of the aromatic vinyl polymerization unit is set to a certain value to thereby improve the cycle characteristics and the output characteristics of a secondary battery.

CITATION LIST

Patent Literature

PTL 1: JP H11-288720 A
PTL 2: JP 2013-179040 A

SUMMARY

Technical Problem

In the meantime, an electrode mixed material layer may contain a conductive material to ensure electrical contact amongst an electrode active material. Moreover, in a slurry composition used in formation of an electrode mixed material layer that contains a conductive material, it is necessary to favorably disperse a conductive material from a viewpoint of enabling favorable formation of the electrode mixed material layer and improving secondary battery performance.

However, slurry compositions containing conventional binder compositions as described above may suffer from aggregation of conductive materials, which may prevent the conductive materials from being favorably dispersed. A good conductive pass may not be formed in an electrode mixed material layer in an electrode produced by using such a slurry composition, which makes production of an electrode mixed material layer having a good uniformity difficult. A secondary battery including such an electrode may experience an increased cell resistance and reduced output characteristics.

Accordingly, an object of the present disclosure is to provide a binder composition for a secondary battery which enables favorable dispersion of a conductive material when used in preparation of a slurry composition for a secondary battery electrode.

Another object of the present disclosure is to provide a conductive material paste for a secondary battery electrode in which a conductive material is favorably dispersed.

Yet another object of the present disclosure is to provide a slurry composition for a secondary battery electrode in which a conductive material is favorably dispersed.

Yet object of the present disclosure is to provide a method of producing such an slurry composition for a secondary battery electrode.

Yet another object of the present disclosure is to provide an electrode for a secondary battery which enables sufficient improvement in battery characteristics of the secondary battery, and a secondary battery having excellent battery characteristics such as output characteristics.

Solution to Problem

The inventors conducted extensive studies to solve the aforementioned problem. The inventors then discovered that a binder composition for a secondary battery containing a polymer having a particular terminal structure used in preparation of a slurry composition for a secondary battery electrode enabled favorable dispersion of a conductive material in the slurry composition for a secondary battery electrode. The inventors completed the present disclosure based on this finding.

More specifically, the present disclosure aims to advantageously solve the problems set forth above by disclosing a presently disclosed binder composition for a secondary battery comprising: a polymer having a structure represented by the following formula (I) at a terminal thereof; and a solvent,

[Formula 1]

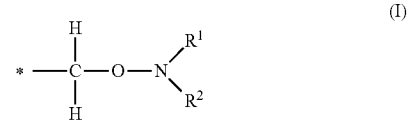

[in Formula (I), $R^1$ and $R^2$ each independently represents an organic group or an organic group in which $R^1$ and $R^2$ together form a ring, and * represents a binding site to the terminal of a main chain of the polymer].

Inclusion of the polymer having the particular terminal structure in the binder composition for a secondary battery in the manner described above enables favorable dispersion of a conductive material when used in preparation of a slurry composition for a secondary battery electrode.

Preferably, in the presently disclosed binder composition for a secondary battery, the polymer has a weight-average molecular weight of more than 10,000 and 500,000 or less. In the case where the weight-average molecular weight of the polymer is within the above range, the conductive material can be made to be dispersed further favorably, and elution of the polymer into the electrolyte solution can be suppressed in a secondary battery that is prepared using the presently disclosed binder composition for a secondary battery.

In addition, in the presently disclosed binder composition for a secondary battery, preferably, a filter passage flow rate of an N-methyl-2-pyrrolidone solution of the polymer (I) determined according to the following equation is 5 g/min or more when 3 g of the N-methyl-2-pyrrolidone solution of the polymer (I) is made to pass through a filter having a diameter of 25 mm and a pore diameter of 0.5 µm at a temperature of 25° C. under a pressure of 0.4 kgf/cm², the N-methyl-2-pyrrolidone solution of the polymer (I) being prepared so as to have a solid content of 2 mass %, $$\text{Filter passage flow rate} = 3/T \text{ (g/min)}$$

[wherein T represents time (in minute) until 3 g of the N-methyl-2-pyrrolidone solution of the polymer completes to pass through].

In the case where the filter passage flow rate is 5 g/min or more, the dispersibility of the conductive material can be further improved when the presently disclosed binder composition for a secondary battery is used in preparation of a slurry composition for a secondary battery electrode.

Further, preferably, in the presently disclosed binder composition for a secondary battery, the polymer contains an aromatic vinyl monomer unit. The polymer containing the aromatic vinyl monomer unit can further improve the dispersibility of the conductive material when the presently disclosed binder composition for a secondary battery is used in preparation of a slurry composition for a secondary battery electrode.

Further, preferably, in the presently disclosed binder composition for a secondary battery, a percentage content of the aromatic vinyl monomer unit in the polymer is more than 30 mass % and 55 mass % or less. In the case where the percentage content of the aromatic vinyl monomer unit in the polymer is within the above range, the conductive material can be dispersed further favorably and the flexibility of an electrode can be improved when the electrode is produced from a slurry composition for a second battery containing the presently disclosed binder composition for a secondary battery.

Further, preferably, in the binder compositions for presently disclosed secondary battery, the polymer has a glass-transition temperature of higher than 5° C. and 45° C. or lower. In the case where the glass-transition temperature of the polymer is within the above range, the dispersibility of the conductive material can be further improved when the presently disclosed binder composition for a secondary battery is used in preparation of a slurry composition for a secondary battery electrode. In addition, when the slurry composition for a secondary battery electrode containing the binder composition for a secondary battery is used in production of an electrode for a secondary battery, staining during roll pressing can be prevented and the flexibility of the electrode can be further improved.

Moreover, the present disclosure aims to advantageously solve the problems set forth above by disclosing a conductive material paste for a secondary battery electrode comprising: any one of the binder compositions for a secondary battery set forth above; and a conductive material. The above-mentioned binder composition for a secondary battery as described above enables favorable dispersion of the conductive material in the conductive material paste for a secondary battery electrode. Moreover, by producing a slurry composition for a secondary battery electrode through addition of an electrode active material and the like to this conductive material paste for a secondary battery electrode, the conductive material can be more favorably dispersed in the slurry composition for a second battery electrode.

Moreover, the present disclosure aims to advantageously solve the problems set forth above by disclosing a presently disclosed slurry composition for a secondary battery electrode comprising: any one of the binder compositions for a secondary battery electrode set forth above, an electrode active material, and a conductive material. The above-mentioned binder composition for a secondary battery enables favorable dispersion of a conductive material in a slurry composition for a secondary battery electrode.

Moreover, the present disclosure aims to advantageously solve the problems set forth above by disclosing a presently disclosed method of producing a slurry composition for a secondary battery electrode comprising: a first step of mixing the conductive material, the polymer, and the solvent to obtain a conductive material paste; and a second step of mixing the conductive material paste and the electrode active material. As described above, by using the method of producing a slurry composition for a secondary battery electrode comprising a first step of mixing the conductive material, the polymer, and the solvent to obtain a conductive material paste; and a second step of mixing the conductive material paste and the electrode active material, a slurry composition for a secondary battery electrode can be efficiently produced which has an excellent dispersibility of the conductive material.

Furthermore, the present disclosure aims to advantageously solve the problems set forth above by disclosing an electrode for a secondary battery comprising an electrode mixed material layer formed using the foregoing slurry composition for a secondary battery electrode. As described above, the above-mentioned slurry composition for a secondary battery electrode enables favorable formation of an electrode mixed material layer. Further, by using an electrode for a secondary battery having this electrode mixed material layer, the cell characteristics of a secondary battery can be improved sufficiently.

Moreover, the present disclosure aims to advantageously solve the problems set forth above by disclosing a secondary battery comprising the electrode for a secondary battery set forth above. Thus, the above-mentioned electrode for secondary battery reduces the cell resistance, which enables provision of a secondary battery having excellent battery characteristics such as output characteristics.

Advantageous Effect

According to the present disclosure, it is possible to provide a binder composition for a secondary battery which enables favorable dispersion of a conductive material when used in preparation of a slurry composition for a secondary battery electrode.

Moreover, according to the present disclosure, it is possible to provide a conductive material paste for a secondary battery electrode in which a conductive material is favorably dispersed.

Moreover, according to the present disclosure, it is possible to provide a slurry composition for a secondary battery electrode in which a conductive material is favorably dispersed.

Moreover, according to the present disclosure, it is possible to provide a method of efficiently producing a slurry composition for a secondary battery electrode having an excellent dispersibility of a conductive material.

Furthermore, according to the present disclosure, it is possible to provide an electrode for a secondary battery which enables sufficient improvement in battery characteristics of the secondary battery, and a secondary battery having excellent battery characteristics such as output characteristics.

DETAILED DESCRIPTION

In the following, embodiments of the disclosure will be described in detail.

Here, a presently disclosed binder composition for a secondary battery (hereinafter also referred to as "binder composition") can be used to prepare a conductive material paste for a secondary battery electrode and a slurry composition for a secondary battery electrode (hereinafter also referred to as "slurry composition"). The slurry composition for a secondary battery electrode and the slurry composition for a secondary battery electrode prepared using the presently disclosed binder composition for a secondary battery can, in turn, be used in production of an electrode for a secondary battery such as a lithium ion secondary battery. Further, a presently disclosed method of producing a slurry composition for a secondary battery electrode enables an effective production of a presently disclosed slurry composition for a secondary battery electrode. Further, a presently disclosed secondary battery comprises an electrode for a secondary battery formed using the presently disclosed slurry composition for a secondary battery electrode. Moreover, preferably, the presently disclosed binder composition for a secondary battery electrode is mixed with a conductive material to produce a conductive material paste for a secondary battery electrode containing the binder composition for a secondary battery electrode and the conductive material, before being used in preparation of a slurry composition for a secondary battery electrode.

Note that the binder composition for a secondary battery, the conductive material paste for a secondary battery electrode, and the slurry composition for a presently disclosed electrode for a secondary battery can be particularly suitably used in formation of a positive electrode of an secondary battery. Further, a presently disclosed binder composition for a secondary battery can also be used in production of a slurry composition for a secondary battery porous membrane. The slurry composition for a secondary battery porous membrane enables production of a porous membrane for a secondary battery and a secondary battery having the porous membrane for a secondary battery.

(Binder Composition for Secondary Battery)

The presently disclosed binder composition for a secondary battery comprises a polymer having a structure represented by the above-mentioned formula (I) at its terminal (hereinafter, this polymer is also referred to as "polymer (I)") and a solvent, and may optionally further comprise an optional polymer and/or optional component.

The presently disclosed binder composition for a secondary battery can be used for preparation of a conductive material paste for a secondary battery electrode containing a conductive material, and a slurry composition for a secondary battery electrode containing an electrode active material and a conductive material. The presently disclosed slurry composition enables favorable dispersion of the conductive material.

Here, the mechanism of the present disclosure is hypothesized as follows although it is not completely clarified. More specifically, it is considered that the above-mentioned structure represented by Formula (I) of the polymer (I) at its terminal helps the polymer (I) to be adsorbed favorably on the surfaces of the conductive material, thereby preventing aggregation of the conductive material, which enables favorable dispersion of the conductive material.

<Polymer (I)>

As described above, the polymer (I) has a structure represented by the following formula (I) at its terminal. Note that the polymer (I) typically has a structure represented by the following formula (I) at one terminal.

[Formula 2]

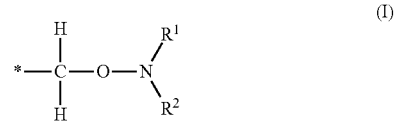

In Formula (I), $R^1$ and $R^2$ each independently represents an organic group or an organic group in which $R^1$ and $R^2$ together form a ring, and * represents a binding site to the terminal of the main chain of the polymer.

Examples of $R^1$ and $R^2$ as such organic groups include linear or branched alkyl groups having a carbon number of 1 to 18; aromatic ring groups such as phenyl group and naphthyl group; and an cyano group. Such an organic group may have a substituent, and examples of the substituent include alkyl groups having a carbon number of 1 to 12, a hydroxyl group, a carboxyl group, a sulfonate group, and aldehyde groups, of which alkyl groups having a carbon number of 1 to 6 are preferred. Further, $R^1$ and $R^2$ may together form a ring made of $R^1$ and $R^2$.

Specific examples of the structure represented by the above formula (I) include, for example, a structure represented by the following formula (II) and a structure represented by the following formula (III). Note that each * in the following formulae (II) and (III) represents a binding site to the terminal of the main chain of the polymer.

[Formula 3]

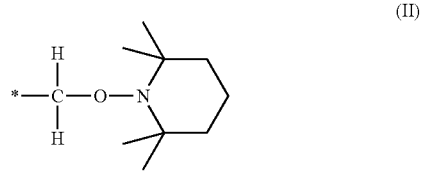

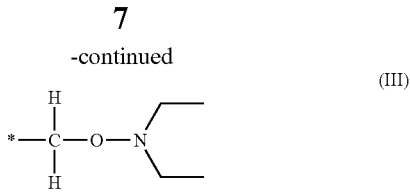

(III)

The polymer (I) described above is not particularly limited as long as it is a polymer having a structure represented by Formula (I) at its terminal, and may contain, for example, a monomer unit which can be included in the polymer (I), as will be described later. Moreover, in this specification, "including a monomer unit" means that "a repeating unit derived from that monomer is included in a polymer obtained using that monomer".

Now, the monomer unit that may be included in the polymer (I) will be described. The percentage content of each monomer unit described below can be measured by a nuclear magnetic resonance (NMR) method such as $^1$H-NMR.

[Aromatic Vinyl Monomer Unit]

The polymer (I) preferably contains at least an aromatic vinyl monomer unit. The polymer (I) containing an aromatic vinyl monomer unit can further improve the dispersibility of a conductive material when the presently disclosed binder composition for a secondary battery is used in preparation of a slurry composition for a secondary battery electrode. Note that an "aromatic vinyl monomer unit" refers to a constitutional unit derived from an aromatic vinyl monomer.

Examples of aromatic vinyl monomers that can be used to form the aromatic vinyl monomer unit include styrene, α-methylstyrene, vinyltoluene, and divinyl benzene.

They may be used alone or in combination of two or more.

The percentage content of the aromatic vinyl monomer unit in the polymer (I) when all repeating units in the polymer (I) are taken to be 100 mass % is preferably more than 30 mass %, more preferably more than 35 mass %, and even more preferably more than 40 mass %, and is preferably 55 mass % or less, more preferably 50 mass % or less, and even more preferably 45 mass % or less. In the case where the percentage content of the aromatic vinyl monomer unit in the polymer (I) exceeds one of the foregoing lower limits, the dispersibility of a conductive material can be further improved when the presently disclosed binder composition is used in preparation of a slurry composition. Additionally, in the case where the percentage content of the aromatic vinyl monomer unit in the polymer (I) is equal to or lower than one of the foregoing upper limits, the flexibility of the electrode can be increased when a slurry composition containing the presently disclosed binder composition is used in production of an electrode for a secondary battery.

[Nitrile Group-Containing Monomer Unit]

The polymer (I) may optionally contain a nitrile group-containing monomer unit. Here, a "nitrile group-containing monomer unit" refers to a repeating unit that is derived from a nitrile group-containing monomer.

Examples of nitrile group-containing monomers that can be used to form the nitrile group-containing monomer unit include an α,β-ethylenically unsaturated nitrile monomer. Specifically, an α,β-ethylenically unsaturated nitrile monomer is not particularly limited as long as it is an α,β-ethylenically unsaturated compound having a nitrile group, and examples include, for example, acrylonitrile; α-halogeno acrylonitrile such as α-chloro acrylonitrile and α-bromo acrylonitrile; α-alkyl acrylonitrile such as methacrylonitrile and α-ethylacrylonitrile, or the like.

They may be used alone or in combination of two or more.

The percentage content of the nitrile group-containing monomer unit in the polymer (I) when all repeating units in the polymer (I) are taken to be 100 mass % is preferably more than 10 mass %, more preferably more than 13 mass %, and even more preferably more than 18 mass %, and is preferably 40 mass % or less, more preferably 33 mass % or less, and even more preferably 28 mass % or less. In the case where the percentage content of the nitrile group-containing monomer unit in the polymer (I) exceeds one of the foregoing lower limits, the solubility of the polymer (I) in a solvent such as N-methyl-2-pyrrolidone (NMP) increases and the dispersibility of a conductive material can be further improved when the presently disclosed binder composition is used in preparation of a slurry composition. Additionally, in the case where the percentage content of the nitrile group-containing monomer unit in the polymer (I) is equal to or lower than one of the foregoing upper limits, an increase in swelling to an electrolyte solution can be suitably suppressed when a slurry composition containing the presently disclosed binder composition is used in production of an secondary battery.

[Hydrophilic Group-Containing Monomer Unit]

The polymer (I) may optionally contains a hydrophilic group-containing monomer unit. Note that a "hydrophilic group-containing monomer unit" refers to a repeating unit that is derived from a hydrophilic group-containing monomer.

Here, examples of hydrophilic group-containing monomers that can be used to form the hydrophilic group-containing monomer unit include polymerizable monomers that have a hydrophilic group. Specifically, examples of hydrophilic group-containing monomers include monomers having acidic group-containing monomer units, hydroxyl group-containing monomer unit, and salts thereof. Examples of acidic group-containing monomer units include a carboxylic acid group, a sulfonate group, and a phosphate group.

Examples of monomers having a carboxylic acid group include monocarboxylic acids, derivatives of monocarboxylic acids, dicarboxylic acids, acid anhydrides of dicarboxylic acids, and derivatives of dicarboxylic acids.

Examples of the monocarboxylic acid include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acid include maleic acid, fumaric acid, and itaconic acid.

Examples of derivatives of dicarboxylic acids include methyl maleic acid, dimethyl maleic acid, phenyl maleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic acid anhydride, methyl maleic anhydride, and dimethyl maleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of the monomer having the sulfonate group include vinyl sulfonic acid, methyl vinyl sulfonic acid, (meth)acrylic sulfonic acid, styrene sulfonic acid, (meth) acrylic acid-2-ethyl sulfonate, 2-acrylamide-2-methyl propane sulfonic acid, and 3-allyloxy-2-hydroxypropane sulfonic acid.

In the present disclosure, "(meth)acryl" is used to indicate "acryl" and/or "methacryl".

Examples of monomers having a phosphate group include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of the hydroxy group-containing monomer include ethylenic unsaturated alcohol, such as (meth)allyl alcohol, 3-butene-1-ol, and 5-hexene-1-ol; alkanol esters of ethylenic unsaturated carboxylic acid, such as 2-hydroxyethyl-acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1—COO—(C_qH_{2q}O)_p—H$ (where p represents an integer of 2 to 9, q represents an integer of 2 to 4, and $R^1$ represents hydrogen or a methyl group); mono(meth)acrylic acid esters of dihydroxy ester of dicarboxylic acid, such as 2-hydroxyethyl-2'-(meth)acryloyl oxyphthalate and 2-hydroxyethyl-2'-(meth) acryloyl oxysuccinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth) allyl-3-hydroxybutyl ether, (meth)allyl-4-hydroxybutyl ether, and (meth) allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

In the present disclosure, "(meth)allyl" is used to indicate "allyl" and/or "methallyl".

They may be used alone or in combination of two or more.

The percentage content of the hydrophilic group-containing monomer unit in the polymer (I) when all repeating units in the polymer (I) are taken to be 100 mass % is preferably more than 0.1 mass %, more preferably more than 1 mass %, and is preferably 10 mass % or less, more preferably 6 mass % or less. In the case where the percentage content of the hydrophilic group-containing monomer unit in the polymer (I) exceeds one of the foregoing lower limits, the adhesion between a current collector and an electrode active material layer can be improved when a slurry composition containing the presently disclosed binder composition is used in production of an secondary battery. Additionally, in the case where the percentage content of the hydrophilic group-containing monomer in the polymer (I) is equal to or lower than one of the foregoing upper limits, the solubility of the polymer (I) to a solvent such as NMP increases.

[Straight Chain Alkylene Structural Unit Having Carbon Number of at Least 4]

The polymer (I) may optionally contain a straight chain alkylene structural unit having a carbon number of at least 4. Note that a "straight chain alkylene structural unit having a carbon number of at least 4" refers to a repeating unit composed of an alkylene structure represented by a general formula —$C_nH_{2n}$— (n is an integer of at least 4).

Here, although no specific limitations are placed on the method by which the straight chain alkylene structural unit having a carbon number of at least 4 is introduced into the polymer (I), the methods described below in (1) and (2) may for example be used.

(1) A method involving preparing a polymer from a monomer composition containing a conjugated diene monomer and hydrogenating the resultant polymer in order to convert the conjugated diene monomer unit to an alkylene structural unit (2) A method involving preparing a polymer from a monomer composition containing a 1-olefin monomer having a carbon number of at least 4

Of these, the method of (1) is preferable because the polymer is readily produced.

Further, examples of conjugated diene monomers that can be used include conjugated diene compounds having a carbon number of at least 4 such as 1,3-butadiene, isoprene, 2,3-dimethyl-1,3-butadiene, and 1,3-pentadiene. Of these conjugated diene monomers, 1,3-butadiene is preferable. In other words, the straight chain alkylene structural unit having a carbon number of at least 4 is preferably a structural unit obtained through hydrogenation of a conjugated diene monomer unit (i.e., the straight chain alkylene structural unit is preferably a hydrogenated conjugated diene unit), and is more preferably a structural unit obtained through hydrogenation of a 1,3-butadiene unit (i.e., the straight chain alkylene structural unit is more preferably a hydrogenated 1,3-butadiene unit). Note that selective hydrogenation of the conjugated diene monomer unit can be carried out by a commonly known method such as an oil-layer hydrogenation method or a water-layer hydrogenation method.

Examples of the 1-olefin monomer having a carbon number of at least 4 include 1-butene and 1-hexene.

They may be used alone or in combination of two or more.

The percentage content of the straight chain alkylene structural unit having a carbon number of at least 4 in the polymer (I) when all repeating units in the polymer (I) are taken to be 100 mass % is preferably more than 15 mass %, more preferably more than 20 mass %, and even more preferably more than 25 mass %, and is preferably 50 mass % or less, more preferably 45 mass % or less, and even more preferably 45 mass % or less. In the case where the percentage content of the linear chain alkylene structural unit having a carbon number of at least 4 in the polymer (I) exceeds one of the foregoing lower limits, the flexibility of an electrode for a secondary battery can be improved when a slurry composition containing the presently disclosed binder composition is used to produce the electrode. Additionally, in the case where the percentage content of the straight chain alkylene structural unit having a carbon number of at least 4 in the polymer (I) is equal to or lower than one of the foregoing upper limits, the solubility of the polymer (I) in a solvent such as N-methyl-2-pyrrolidone (NMP) increases.

The percentage content of the polymer (I) in the binder composition for a secondary battery is preferably 0.01 mass % or more and preferably 20 mass % or less, in terms of solid content. In the case where the percentage content of the polymer (I) is within the above range, a slurry composition for a secondary battery electrode can be readily prepared using the binder composition for a secondary battery.

[Optional Monomer Unit]

Other than the above-described repeating units, the polymer (I) may contain a repeating unit derived from a monomer other than above-mentioned polymers, which is copolymerizable with a monomer constituting the above-described repeating unit, as an optional monomer unit.

Examples of other monomers capable of forming an optional monomer unit include, for example, acrylic acid alkyl ester such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate (also referred to as "2-ethyl hexyl acrylate"), nonyl acrylate, decyl acrylate, lauryl acrylate, n-tetradecyl acrylate, and stearyl acrylate; and methacrylic acid alkyl ester, such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these, acrylic acid alkyl esters having an alkyl group with a carbon number of 2 to 12 bonded to a non-carbonyl oxygen atom are more preferable because (i) they have solubility to NMP which is preferably used as a solvent for a slurry composition for an electrode, particularly a slurry composition for a positive electrode, without eluting into an electrolytic solution, and (ii) they improve the flexibility of an electrode, prevent peeling-off of an electrode upon production of a wound cell, and provide a secondary battery including the electrode with excellent characteristics (cycle characteristics and the like). Of these, particularly preferred are ethyl acrylate, n-butyl acrylate, 2-ethylhexyl acrylate, nonylacrylate, and lauryl acrylate.

The percentage content of the above-mentioned optional monomer unit in the polymer (I) when all repeating units in the polymer (I) are taken to be 100 mass % is preferably 40 mass % or less, more preferably 30 mass % or less, even more preferably 20 mass % or less, and most preferably 1 mass % or less. Of course, the polymer (I) may contain no optional monomer unit. In other words, the percentage content of such an optional monomer unit in the polymer (I) may be substantially 0 mass %.

[Method of Producing Polymer (I)]

No specific limitations are placed on the method of producing the polymer (I) set forth above. Yet, the polymer (I) may be produced through polymerization of a monomer composition containing the above-described monomers with a known method optionally in the presence of a chain transfer agent, in which a nitroxy radical compound such as 2,2,6,6-tetramethyl piperidine 1-oxyl (TEMPO) or a derivative thereof, or a hydroxyamine derivative such as diethyl hydroxyamine, is caused to act, thereby introducing a structure represented by the above-mentioned formula (I) into the terminal of the polymer, at a point in time when the conversion rate of the monomers to the polymer (I) reaches preferably 98% or less, more preferably 95% or less, and even more preferably 90% or less, for example.

The method of polymerization of the polymer (I) is not specifically limited and may, for example, be any of solution polymerization, suspension polymerization, bulk polymerization, and emulsion polymerization. Also, any polymerization reaction can be used, such as ionic polymerization, radical polymerization, or living radical polymerization.

Further, an emulsifier, dispersant, polymerization initiator, polymerization aid, or the like used in polymerization may be the same as typically used, and the amount thereof may also be the same as typically used. The polymer (I) preferably has the following properties in addition to the above-described structure.

[Properties of Polymer (I)]

[[Weight-Average Molecular Weight of Polymer (I)]]

The weight-average molecular weight (Mw) of the polymer (I) is preferably more than 10,000, and is preferably 500,000 or less, more preferably 300,000 or less, and even more preferably 150,000 or less. In the case where the weight-average molecular weight of the polymer (I) exceeds the above lower limit, elution of the polymer (I) into an electrolyte solution can be suppressed when a slurry composition containing the presently disclosed binder composition is used to produce a secondary battery. Additionally, in the case where the weight-average molecular weight of the polymer (I) is equal to or lower than one of the foregoing upper limits, the dispersibility of a conductive material can be improved when the presently disclosed binder composition is used in preparation of a slurry composition.

The "weight-average molecular weight" of the polymer (I) is measured by a method described in the EXAMPLES section of the present specification.

[[Filter Passage Flow Rate]]

In the present disclosure, the filter passage flow rate of an N-methyl-2-pyrrolidone solution of the polymer (I) determined according to the following equation is 5 g/min or more, more preferably 10 g/min or more, even more preferably 15 g/min or more, and most preferably 20 g/min or more, when 3 g of the N-methyl-2-pyrrolidone solution of the polymer (I) is made to pass through a filter having a diameter of 25 mm and a pore diameter of 0.5 μm at a temperature of 25° C. under a pressure of 0.4 kgf/cm$^2$, and the N-methyl-2-pyrrolidone solution of the polymer (I) is prepared so as to have a solid content of 2 mass %.

In the case where the filter passage flow rate is equal to or higher than one of the foregoing lower limits, the dispersibility of the conductive material can be further improved when the presently disclosed binder composition is used to prepare a conductive material paste or a slurry composition.

Note that a filter made of an olefin resin such as polypropylene (PP) or a fluororesin such as polytetrafluoroethylene (PTFE) can be used as the filter, for example. Further, the filter passage flow rate can be adjusted by adjusting the weight-average molecular weight of the polymer (I), the polymer composition (composition ratio of monomers), and the terminal structure of the polymer (I).

[Glass-Transition Temperature]

Further, the glass-transition temperature (Tg) of the polymer (I) is, but not limited to, preferably higher than 5° C., more preferably higher than 10° C., even more preferably higher than 15° C., and most preferably 20° C. or higher, and is preferably 45° C. or lower, more preferably 40° C. or lower, and even more preferably 30° C. or lower. In the case where the glass-transition temperature of the polymer (I) exceeds one of the foregoing lower limits or is equal to or higher than the foregoing lower limit, the dispersibility of the conductive material can be further improved when the presently disclosed binder composition is used to prepare a conductive material paste or a slurry composition. Additionally, in the case where the glass-transition temperature of the polymer (I) is equal to or lower than one of the foregoing upper limits, staining during roll pressing can be prevented and the flexibility of an electrode for a secondary battery can be improved when a slurry composition containing the presently disclosed binder composition is used to produce the electrode.

The glass-transition temperature of the polymer (I) can be adjusted by combining a variety of monomers.

Here, the glass-transition temperature of the polymer (I) can be measured by a differential scanning calorimeter (DSC).

[[Iodine Value]]

The iodine value of the polymer (I) is preferably 50 mg/100 mg or less, more preferably 25 mg/100 mg or less, and even preferably 8 mg/100 mg or less. In the case where the iodine value of the polymer (I) is equal to or lower than one of the foregoing upper limits, the dispersibility of a conductive material can be further improved when the presently disclosed binder composition is used in preparation of a slurry composition. Note that the iodine value can be determined in accordance with JIS K 6235:2006.

<Solvent>

The solvent of the binder composition for a secondary battery may be an organic solvent, but is not specifically limited thereto. Examples of organic solvent include, for example, alcohols such as methanol, ethanol, n-propanol, isopropanol, n-butanol, isobutanol, t-butanol, pentanol, hexanol, heptanol, octanol, nonanol, decanol and amylalcohol; ketones such as acetone, methyl ethyl ketone and cyclohexanone; esters such as ethyl acetate and butyl acetate; ethers such as diethyl ether, dioxane and tetrahydrofuran; amide based polar organic solvent such as N,N-dimethylformamide and N-methyl-2-pyrrolidone (NMP); and aromatic hydrocarbons such as toluene, xylene, chlorobenzene, ortho-dichlorobenzene, para-dichlorobenzene.

They may be used alone or in combination of two or more.

Of these, NMP is preferable as the solvent.

Here, the boiling point under normal pressure (1 atm) of the organic solvent is preferably 80° C. or higher, more preferably 120° C. or higher, and even more preferably 150° C. or higher, and is preferably 250° C. or lower, and more preferably 220° C. or lower. In the case where the boiling point of the organic solvent is equal to or higher than one of the foregoing lower limits, the presently disclosed binder composition can be used to prepare a slurry composition suitable for coating. Additionally, in the case where the boiling point of the organic solvent is equal to or lower than one of the foregoing upper limits, a slurry composition coated on a current collector or the like can be dried at a high temperature.

<Optional Polymer>

An optional polymer that may be optionally contained in the presently disclosed binder composition for a secondary battery is not limited, and any of well-known polymers that may be used as binders in the field of secondary batteries can be used as the optional polymer as long as it is a polymer other than the above-mentioned polymer (I).

Examples of the optional polymer include, for example, fluorine-containing polymers such as polyvinylidene fluoride (PVDF), polyvinylidene fluoride-hexafluoropropylene (PVDF-HFP), and polyacrylo nitrile (PAN).

When both of the polymer (I) and an optional polymer are contained in the binder composition, the percentage content of the optional polymer is 0 mass % or more, preferably 10 mass % or more, and is preferably 98 mass % or less, more preferably 97 mass % or less, when the total amount of the polymer (I) and the optional polymer is taken as 100 mass % in terms of solid content. In the case where the percentage content of the optional polymer is equal to or higher than one of the foregoing lower limits, the battery resistance can be further reduced when a slurry composition containing the presently disclosed binder composition is used to produce a secondary battery. Additionally, in the case where the percentage content of the other polymer is equal to or lower than one of the foregoing upper limits, sedimentation of the components in a slurry composition can be prevented.

<Optional Component>

The presently disclosed binder composition for a secondary battery may contain an optional component which is known as a component for binder compositions. Examples of the optional component include wetting agents, leveling agents, and electrolyte solution decomposition inhibitors.

<Preparation of Binder Composition for Secondary Battery>

The presently disclosed binder composition for a secondary battery can be prepared by dissolving or dispersing the above-described polymer (I) and an optional polymer and/or optional component which may be optionally added, into a solvent. Specific methods for mixing are not particularly limited.

When the polymer (I) has been prepared as a water dispersion, it is preferable to mix the water dispersion with the solvent and then remove water for use in preparation of a binder composition.

(Conductive Material Paste for Secondary Battery Electrode)

The presently disclosed conductive material paste for a secondary battery electrode contains the above-described binder composition for a secondary battery and a conductive material, and may optionally further contain an optional polymer and/or optional component. In other words, the presently disclosed conductive material paste for a secondary battery electrode contains the above-described polymer, a conductive material, and a solvent, and may further contain an optional polymer and/or optional component which may be optionally. Because the presently disclosed conductive material paste for a secondary battery electrode contains the binder composition for a secondary battery described above, it enables favorable dispersion of the conductive material and is excellent in the dispersion stability.

Here, the solid content concentration in the presently disclosed conductive material paste for a secondary battery electrode is preferably 1 mass % or less and more preferably 3 mass % or less, and is preferably 20 mass % or less and more preferably 15 mass % or less. In the case where the solid content concentration in the conductive material paste for a secondary battery electrode is equal to or higher than one of the foregoing lower limits, the effect of the conductive material is exhibited favorably. Additionally, in the case where the solid content concentration in the conductive material paste for a secondary battery electrode is equal to or lower than one of the foregoing upper limits, a sufficient stability of dispersion of the conductive material is ensured.

<Proportion of Total Solid Content in Binder Composition to Total Solid Content in Conductive Material Paste for Secondary Battery Electrode>

Further, the proportion of the total solid content in the binder composition to 100 mass % of the total solid content in the conductive material paste for a secondary battery electrode is preferably 0.1 mass % or more, more preferably 1 mass % or more, even more preferably 2 mass % or more, and is preferably 30 mass % or less, more preferably 25 mass % or less, and even more preferably 20 mass % or less. In the case where the proportion of the total solid content in the binder composition to the total solid content in the conductive material paste for a secondary battery electrode is equal to or more than one of the foregoing lower limits, the conductive material can be dispersed favorably in the conductive material paste for a secondary battery electrode, which results in a stabilized viscosity of the conductive material paste for a secondary battery electrode. Additionally, in the case where the proportion of the total solid content in the binder composition to the total solid content in the conductive material paste for a secondary battery electrode is equal to or lower than one of the foregoing upper limits, the battery resistance of the secondary battery can be reduced when a slurry for a secondary battery electrode containing the presently disclosed conductive material paste for a secondary battery electrode is used to produce a secondary battery.

The method of preparing the presently disclosed conductive material paste for a secondary battery electrode is not particularly limited, and the conductive material paste can be obtained, for example, by mixing the above-described binder composition for a secondary battery and a conductive material with any suitable method. The conductive material contained in the conductive material paste for a secondary battery electrode will be described in detail later.

(Slurry Composition for Secondary Battery Electrode)

The presently disclosed slurry composition for a secondary battery electrode contains the above-described binder composition for a second battery, an electrode active material, and a conductive material, and may optionally further contain an optional polymer and/or optional component. In other words, the presently disclosed slurry composition for a secondary battery electrode contains the above-mentioned polymer (I), an electrode active material, a conductive material, and a solvent, and may optionally further contain an optional polymer and/or optional component. The presently disclosed slurry composition for a secondary battery electrode enables favorable dispersion of the conductive material as a result of containing the above-described binder composition for a second battery. Consequently, a second battery electrode that includes an electrode mixed material layer formed using the presently disclosed slurry composition for a secondary battery electrode has a highly uniform electrode mixed material layer because a good conduction path is formed in the electrode mixed material layer, and enables a secondary battery to exhibit excellent battery characteristics.

The following describes one example in which the slurry composition for a secondary battery electrode is a slurry composition for lithium ion secondary battery electrode. However, the present disclosure is not limited to the following example.

Note that, for a good dispersibility of the conductive material and a good adhesion to a current collector, the total solid content in the binder composition is preferably 0.1 mass % or more, more preferably 0.3 mass % or more, even more preferably 0.5 mass % or more, and is preferably 5 mass % or less, more preferably 4 mass % or less, and even more preferably 3 mass % or less, relative to 100 mass % of the total solid content in the slurry composition.

<Electrode Active Material>

The electrode active material is a substance that accepts and donates electrons in an electrode of a secondary battery. A substance that can occlude and release lithium is typically used as an electrode active material for a lithium ion secondary battery. Note that, for achieving a battery capacity in a practical range, the electrode active material is contained in the amount of preferably 90 mass % or more, more preferably 92 mass % or more, and is preferably 99.5 mass % or less, more preferably 99 mass % or less, relative to 100 mass % of the solid content in the slurry composition.

[Positive Electrode Active Material]

Specific examples of positive electrode active materials for lithium ion secondary batteries that may be used include, but are not specifically limited to, known positive electrode active materials such as lithium-containing cobalt oxide ($LiCoO_2$), lithium manganate ($LiMn_2O_4$), lithium-containing nickel oxide ($LiNiO_2$), lithium-containing composite oxide of Co—Ni—Mn ($Li(CoMnNi)O_2$), lithium-containing composite oxide of Ni—Mn—Al, lithium-containing composite oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, lithium rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

The blending amount and the particle diameter of the positive electrode active material are not limited, and may be the same as those of conventionally used positive electrode active materials.

[Negative Electrode Active Material]

Further, examples of negative electrode active materials for lithium ion secondary batteries include carbon-based negative electrode active materials, metal-based negative electrode active materials, and negative electrode active materials formed by combining these materials.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

Examples of carbonaceous materials include graphitizing carbon and non-graphitizing carbon, typified by glassy carbon, which has a structure similar to an amorphous structure.

Here, examples of easily graphitizable carbon include a carbon material made from tar pitch that can be obtained from oil or coal. Specific examples of easily graphitizable carbon include coke, mesocarbon microbeads (MCMB), mesophase pitch-based carbon fiber, and pyrolytic vapor grown carbon fiber.

Examples of less graphitizable carbon include baked phenolic resin, polyacrylonitrile-based carbon fiber, pseudo-isotropic carbon, baked furfuryl alcohol resin (PFA), and hard carbon.

Examples of graphitic materials include natural graphite and artificial graphite.

Examples of artificial graphite include artificial graphite resulting from heat treatment, mainly at 2,800° C. or higher, of carbon that contains easily graphitizable carbon; graphitized MCMB resulting from heat treatment, at 2000° C. or higher, of MCMB; graphitized mesophase pitch-based carbon fiber resulting from heat treatment, at 2000° C. or higher, of mesophase pitch-based carbon fiber; and the like.

The metal-based negative electrode active material is an active material that contains metal, the structure of which usually contains an element that allows insertion of lithium, and that exhibits a theoretical electric capacitance of 500 mAh/g or higher per unit mass when lithium is inserted. For the metal-based active material, for example, lithium metal, an elementary metal that can be used to form lithium alloys (for example, Ag, Al, Ba, Bi, Cu, Ga, Ge, In, Ni, P, Pb, Sb, Si, Sn, Sr, Zn, Ti, and the like) and alloys thereof; and oxides, sulfides, nitrides, silicides, carbides, and phosphides thereof can be used. Of these metal-based negative electrode active materials, active materials containing silicon (silicon-based negative electrode active materials) are preferred. With the use of the silicon-based negative electrode active material, the capacity of the lithium ion secondary battery can be increased.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon.

The blending amount and the particle diameter of the negative electrode active material may be, but are not limited to, the same as those of conventionally-used negative electrode active materials.

<Conductive Material>

The conductive material ensures electrical contact amongst an electrode active material. Examples of conductive materials that can be used include conductive carbon materials such as carbon black (for example, acetylene black, Ketjen Black® (Ketjen black is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

They may be used alone or in combination of two or more.

Of the conductive materials listed above, conductive carbon materials are preferable as the conductive material in terms of having excellent chemical stability.

The percentage content of the conductive material in the slurry composition for a secondary battery electrode is preferably 0.1 mass % or more, and is preferably 3 mass % or less, more preferably 2 mass % or less, and even more preferably 1 mass % or less, relative to 100% of the total solid content in the slurry composition. In the case where the percentage content of the conductive material is equal to or higher than the above lower limit, the contact among the electrode active material of an electrode can be sufficiently ensured. Additionally, in the case where the percentage content of the conductive material is equal to or lower than one of the foregoing upper limits, the stability of the slurry composition can be ensured sufficiently and the sufficient density of an electrode mixture layer can be ensured to thereby sufficiently increase the capacity of a secondary battery.

<Optional Component>

Examples of an optional component that may be contained in the slurry composition include, but are not specifically limited to, the same optional components that may be contained in the presently disclosed binder composition.

These optional components may be used alone or in combination of two or more.

<Preparation of Slurry Composition for Secondary Battery Electrode>

The presently disclosed slurry composition for a secondary battery electrode can be prepared by mixing or dispersing the components described above in a solvent such as an organic solvent. The mixing order is not limited, and all components may be charged at once or the components may be charged and mixed in a stepwise manner. In order to improve the dispersibility of the conductive material, a preferred method is one in which the conductive material and the polymer are mixed first, and the electrode active material is then charged and mixed. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Note that a solvent contained in a binder composition may be used as a solvent used for preparation of a slurry composition.

Here, although an example of a presently disclosed method of producing a slurry composition for a secondary battery electrode will be described below, the presently disclosed method of producing a slurry composition for a secondary battery electrode is not limited to the following example.

[Method of Producing Slurry Composition for Secondary Battery Electrode]

The method of producing the presently disclosed slurry composition for a secondary battery electrode is a method of producing the slurry composition for a secondary battery electrode mentioned above, comprising a first step of mixing a conductive material, a polymer, and a solvent to obtain a conductive material paste, and a second step of mixing the conductive material paste and an electrode active material. As the conductive material, the polymer, and the solvent used in the method of producing the presently disclosed slurry composition for a secondary battery electrode, those described above in the composition for a secondary battery and the slurry composition for a secondary battery electrode described above can be used, and the suitable ratio of these components is the same as the suitable ratio of the components in the binder composition for a secondary battery and the slurry composition for a secondary battery electrode described above. Note that the components may be mixed with a known method in the first step and the second step.

(Electrode for Secondary Battery)

The presently disclosed electrode for a secondary battery includes a current collector and an electrode mixed material layer formed on the current collector, wherein the electrode mixed material layer is formed using the presently disclosed slurry composition for a secondary battery electrode. In other words, the electrode mixed material layer contains at least the polymer (I), an electrode active material, and a conductive material. Components contained in the electrode mixed material layer are components that are contained in the presently disclosed slurry composition for a secondary battery electrode. Furthermore, the suitable ratio of these components is the same as the suitable ratio of these components in the slurry composition.

The presently disclosed electrode for a secondary battery includes an electrode mixed material layer formed using a slurry composition containing the presently disclosed binder composition for a secondary battery, and a conductive pass is formed favorably in the electrode mixed material layer. Consequently, a secondary battery having excellent battery characteristics such as output characteristics can be obtained using this electrode for a second battery because the battery resistance is reduced.

<Method of Producing Electrode for Secondary Battery>

The presently disclosed electrode for a secondary battery can be produced, for example, through a step of applying the presently disclosed slurry composition onto a current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specifically, the slurry composition may be applied for example by doctor blading, dip coating, reverse roll coating, direct roll coating, gravure coating, extrusion coating, or brush coating. The slurry composition may be applied onto one side or both sides of the current collector. The thickness of the slurry coating on the current collector after application but before drying may be set as appropriate in accordance with the thickness of the electrode mixed material layer to be obtained after drying.

Here, for the current collector to which the slurry composition is applied, a material is used, which is electrically conductive and electrochemically durable. Specifically, a current collector formed from iron, copper, aluminum, nickel, stainless steel, titanium, tantalum, gold, platinum, or the like, for example, may be used as the current collector. The above materials may be used alone or in combination of two or more thereof in any ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector as described above, an electrode active material layer is formed on the current collector, thereby providing an electrode for secondary battery-use that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector.

(Secondary Battery)

The presently disclosed secondary battery includes a positive electrode, a negative electrode, an electrolyte solution, and a separator. In the presently disclosed secondary battery, the presently disclosed electrode for a secondary battery is used as at least one of the positive electrode and the negative electrode. The presently disclosed secondary battery has a reduced battery resistance and has excellent battery characteristics such as output characteristics as a result of including the presently disclosed electrode for a secondary battery.

Here, the presently disclosed secondary battery is preferably a secondary battery in which the presently disclosed electrode for a secondary battery is used as a positive electrode. Although the following describes, as one example, a case in which the secondary battery is a lithium ion secondary battery, the presently disclosed secondary battery is not limited to the following example.

<Electrode>

Known electrodes that are used in production of secondary batteries can be used without any specific limitations in the presently disclosed secondary battery as an electrode other than the electrode for a secondary battery set forth above. Specifically, an electrode obtained by forming an electrode mixed material layer on a current collector by a known production method may be used as an electrode other than the electrode for a secondary battery set forth above.

<Separator>

Examples of separators that can be used include, but are not specifically limited to, those described in JP 2012-204303 A. Of these separators, a fine porous membrane made of polyolefinic (i.e., polyethylene, polypropylene, polybutene, and polyvinyl chloride) resin is preferred, because such a membrane can reduce the total thickness of the separator, which increases the ratio of the electrode active material in the secondary battery, consequently increasing the capacity per volume.

<Electrolyte Solution>

As the electrolyte solution, an organic electrolyte solution yielded by dissolving a supporting electrolyte into an organic solvent is normally used. The supporting electrolyte of a lithium ion secondary battery may, for example, be a lithium salt. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable and $LiPF_6$ is particularly preferable as these lithium salts readily dissolve in a solvent and exhibit a high degree of dissociation. Electrolytes may be used alone or in combination at any ratio. Typically, lithium ion conductivity tends to increase as a supporting electrolyte with a higher degree of dissociation is used. Therefore, lithium ion conductivity can be adjusted by selecting the type of supporting electrolyte.

The organic solvent used in the electrolyte solution is not specifically limited so long as the supporting electrolyte can dissolve therein. Examples of suitable organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable for their high dielectric constant and broad stable potential region, and a mixture of ethylene carbonate and ethyl methyl carbonate is more preferable.

The concentration of the electrolyte in the electrolyte solution can be adjusted as needed. For example, the concentration is preferably 0.5% to 15% by mass, more preferably 2% to 13% by mass, even more preferably 5% to 10% by mass. Known additives such as fluoroethylene carbonate and ethyl methyl sulfone may be added to the electrolyte solution.

<Method of Producing Secondary Battery>

The presently disclosed secondary battery may be produced, for example, by laminating a positive electrode and a negative electrode with a separator arranged therebetween, rolling or folding the resulting laminate as necessary in accordance with the battery shape, placing it in a battery container, injecting an electrolyte solution into the battery container, and sealing the container. In order to prevent pressure increase inside the secondary battery and occurrence of overcharging or overdischarging, an overcurrent preventing device such as a fuse or a PTC device; an expanded metal; or a lead plate may be provided as necessary. The secondary battery may take any shape, for example, may be shaped like a coin, a button, a sheet, a cylinder, a square, or a plane.

The presently disclosed binder composition can be used for preparation of the presently disclosed slurry composition for a secondary battery electrode, as well as preparation of a slurry composition for a porous membrane of a secondary battery such as a lithium ion secondary battery. The slurry composition for a secondary battery porous membrane then can be used to form a porous membrane for a secondary battery. The porous membrane for a secondary battery can then be used to produce a secondary battery such as lithium ion secondary battery.

EXAMPLES

The present disclosure will now be described below based on examples. However, the present disclosure is not limited to the examples disclosed herein. In the following description, "%" and "parts" used in expressing quantities are by mass, unless otherwise specified. Moreover, the percentage of monomer units in the polymer usually corresponds to the ratio (charging ratio) of monomers capable of forming the respective monomer units in a monomer composition used for polymerization of the polymer.

In the examples and comparative examples, the filter passage flow rate, the dispersibility of a conductive material, the flexibility of an electrode, the battery resistance, and the weight-average molecular weight, the glass-transition temperature (Tg), and the iodine value of a polymer were measured and evaluated by the following methods.

<Filter Passage Flow Rate>

Into a 5-ml lock-type syringe (trade name: Terumo Syringe Lock Base manufactured by Terumo Corporation) having attached thereto a filter (trade name: SHPX005 manufactured by ROKI TECHNO CO., LTD.) having a diameter of 25 mm and a pore diameter of 0.5 μm, 3 g of an NMP solution of a polymer was charged, which had been adjusted so that the solid content concentration was 2 mass %, under a condition of a temperature of 25° C. The syringe was vertically mounted to a support rod, and a load of 2 kg (0.4 kgf/cm$^2$) was applied to the pusher of the syringe so that the solution was made to pass through the filter.

The time T (min) until 3 g of the charged NMP solution of the polymer completed to pass through the filter was measured, and the filter passage flow rate was calculated using the following formula:

Filter passage flow rate=$3/T$ (g/min)

The details of the filters used are as follows.
Material: polypropylene
Filtering accuracy: 0.5

<Dispersibility of Conductive Material>

The viscosity of a conductive material paste for a positive electrode prepared was measured using a B-type viscometer under conditions of a temperature of 25° C. and a rotor rotation speed of 60 rpm. The dispersibility of the conductive material was evaluated according to the following criteria. When the solid content concentration is the same, a lower viscosity indicates a better dispersibility of a conductive material in a conductive material paste for a positive electrode and in a slurry composition prepared using that conductive material paste for a positive electrode.

A: 40 Pa·s or less
B: more than 40 Pa·s and 50 Pa·s or less
C: more than 50 Pa·s and 60 Pa·s or less
D: more than 60 Pa·s <Flexibility of Electrode>

A positive electrode produced was wound on circular cylinders made of SUS (stainless steel) so that a positive electrode mixture layer was exposed externally, and was inspected visually to see whether or not any crack occurred. The flexibility of the electrode was then evaluated according to the following criteria based on the largest diameter of the cylinder on which a crack occurred. A smaller largest diameter of the cylinder where crack occurred indicates a higher flexibility of the electrode.

A: 1 mm or less
B: more than 1 mm and 3 mm or less
C: more than 3 mm and 5 mm or less
D: more than 5 mm <Battery Resistance>

In a secondary battery, the rate characteristic is strongly affected by the cell resistance. A lithium ion secondary battery produced was charged to 4.2 V at a rate of 0.2 C by the constant-current charging method and then charged to a current of 0.02 C by the constant-voltage charging method, under a condition of 25° C. Thereafter, the lithium ion secondary battery was discharged at a rate of 0.2 C by the constant-current method, and the capacity upon the completion of discharge was taken as C1. A similar measurement was carried out under the same conditions except that discharge rate was 2.0 C, and the capacity upon the completion of discharge was taken as C2. The rate characteristic was calculated with the following formula. The battery resistance of the secondary battery was evaluated according to the following criteria. A greater rate characteristic indicates a lower cell resistivity.

Rate characteristic=($C2/C1\times100$(%))

A: 85% or more
B: 80% or more and less than 85%
C: 75% or more and less than 80%
D: Less than 75%

<Weight-Average Molecular Weight of Polymer>

The weight-average molecular weight of a polymer was determined by gel permeation chromatography (GPC). Specifically, the weight-average molecular weight in terms of a standard substance was calculated by creating a calibration curve of the standard substance using polystyrene. The measurement conditions are as follows:

<<Measurement Conditions>>

The conditions for the measurement apparatus were as follows.

Column: TSK gel α-M columns×2 ((φ 7.8 mm I.D.×30 cm×2 (Tosoh Corporation))
Elute: dimethylformamide (50 mM of lithium bromide, 10 mM of phosphoric acid)
Flow rate: 0.5 mL/min.
Sample concentration: about 0.5 g/L (solid concentration)
Injection volume: 200 μL
Column temperature: 40° C.
Detector: differential refractive index detector RI (HLC-8320 GPC RI detector, Tosoh Corporation)
Detector conditions: RI: Pol (+), Res (1.0 s)
Molecular weight marker: Standard polystyrene kit (PStQuick K, Tosoh Corporation)

<Glass-Transition Temperature>

The glass-transition temperature of the polymer was measured as follows.

The glass-transition temperature was determined in accordance with JIS K 7121 (1987) using a differential scanning calorimeter (DSC6220SII manufactured by Nano Technology, Inc.).

<Iodine Value>

The iodine value of a polymer was measured as follows.

After coagulating 100 g of a water dispersion of a polymer (binder composition) in 1 L of methanol, vacuum drying was performed for 12 hours at a temperature of 60° C. The iodine value of a resultant dried polymer was measured in accordance with JIS K6235 (2006).

Example 1

<Production of Polymer>

To a reactor, 180 parts of deionized water, 25 parts of an aqueous solution of sodium dodecyl benzene sulfonate (concentration: 10%) as an emulsifier, 43 parts of styrene as an aromatic vinyl monomer, 23 parts of acrylonitrile as a nitrile group-containing monomer, 4 parts of methacrylic acid as a carboxylic acid group-containing monomer, and 2 parts of t-dodecyl mercaptan as a chain transfer agent were charged in this order. Gas inside the reactor was purged three times with nitrogen and then 30 parts of 1,3-butadiene was charged as a conjugated diene monomer. The reactor kept at 10° C. was charged with 0.1 parts of cumene hydroperoxide as a polymerization initiator to initiate polymerization, and the polymerization was allowed to proceed while the solution was stirred. At the point in time when the conversion rate of the monomers to the polymer reached 85%, 0.15 parts of 2,2,6,6-tetramethyl piperidine 1-oxyl (TEMPO) was allowed to act. The residual monomers were then removed with a rotary evaporator with a water temperature of 60° C., thereby obtaining a water dispersion of a precursor of a target polymer (particulate polymer).

The resultant 400 mL (total solid content: 48 g) of an aqueous dispersion of the precursor polymer was loaded into a 1-L autoclave with a stirrer, and nitrogen gas was flowed for 10 minutes to remove oxygen dissolved in the water dispersion. After that, as a hydrogenation reaction catalyst, 50 mg of palladium acetate was dissolved in 180 mL of water to which nitric acid had been added in an amount of four molar equivalents of palladium (Pd), and the resultant solution was added. The system was purged twice with hydrogen gas, and then the contents of the autoclave were heated to 50° C. in a state in which the pressure was increased to 3 MPa with hydrogen gas and a hydrogenation reaction was performed for 6 hours to obtain the target polymer. Then, in order to determine the terminal structure of the target polymer, water was distilled off with a rotary evaporator. The residue was then dried under vacuum at 60° C. for 24 hours, and was dissolved in heavy chloroform, followed by identification of the terminal structure by $^1$H-NMR and $^{13}$C-NMR.

<Preparation of Binder Composition for Positive Electrode>

The water dispersion of the polymer obtained as described above and NMP as an organic solvent were mixed. Water contained in the resulting mixed solution was then evaporated off thoroughly under reduced pressure to yield a binder composition for a positive electrode containing the polymer and NMP. The obtained binder composition for a positive electrode was used to evaluate the filter passage flow rate. Table 1 lists the results.

<Preparation of Conductive Material Paste for Positive Electrode>

Using a disper blade, 1.0 parts of carbon nanotubes (specific surface area: 150 m$^2$/g) as a conductive material, 0.04 parts (in terms of solid content) of the binder composition for a positive electrode obtained as described above, and NMP were stirred (at 3000 rpm, and for 10 minutes) to prepare a conductive material paste for a positive electrode. Note that the amount of NMP added was adjusted so that the solid content concentration of the obtained conductive material paste for a positive electrode became 4 mass %. The obtained conductive material paste for a positive electrode was used to evaluate the dispersibility of the conductive material. Table 1 lists the results.

<Preparation of Slurry Composition for Positive Electrode>

To the conductive material paste for a positive electrode obtained as described above, 100 parts of a ternary active material having a layered structure (LiNi$_{0.5}$Co$_{0.2}$Mn$_{0.3}$O$_2$, average particle size: 10 µm) as a positive electrode active material, 0.96 parts of polyvinylidene fluoride (PVDF) as an optional polymer, and NMP as an organic solvent were added, which were stirred with a disper blade (3000 rpm, 20 minutes), to prepare a slurry composition for a positive electrode. Note that the amount of NMP added was adjusted so that the viscosity (measured by a single cylindrical rotary viscometer according to JIS Z8803: 1991; temperature: 25° C., rotational speed: 60 rpm) of the resultant slurry composition for a positive electrode was within a range of 4000 to 5000 mPa·s.

<Production of Positive Electrode>

Aluminum foil of 20 µm in thickness was prepared as a current collector. The slurry composition for a positive electrode obtained as described above was then applied onto the aluminum foil using a comma coater such as to have a mass per unit area after drying of 20 mg/cm$^2$. The applied slurry composition for a positive electrode was dried for 20 minutes at 90° C. and 20 minutes at 120° C., and was subsequently heat treated for 10 hours at 60° C. to obtain a positive electrode web. This web of positive electrode was then rolled by roll pressing to produce a positive electrode in the form of a sheet composed of aluminum foil and a positive electrode mixed material layer with a density of 3.2 g/cm$^3$. The thickness of the positive electrode in the form of a sheet was 70 µm. The positive electrode in the form of a sheet was then cut into a width of 4.8 cm and a length of 50 cm to yield a positive electrode for a lithium ion secondary battery. The flexibility of the positive electrode was evaluated. Table 1 lists the results.

<Production of Negative Electrode>

A mixture of 90 parts of spherical artificial graphite (volume average particle size: 12 µm) and 10 parts of SiO$_x$ (volume average particle size: 10 µm) as a negative electrode active material, 1 part of styrene butadiene polymer as a binder, 1 part of carboxymethyl cellulose as a thickener, and an appropriate amount of water as a dispersion medium were stirred in a planetary mixer to prepare a slurry composition for a negative electrode.

Next, a copper foil with a thickness of 15 µm was prepared as a current collector. Then the slurry composition for a negative electrode obtained as described above was applied to one side of the copper foil so that the coating amount after drying could be 10 mg/cm$^2$, and the slurry composition was then dried for 20 minutes at 60° C. and for 20 minutes at 120° C. Subsequently, the resultant slurry composition was subjected to thermal processing for 20 minutes at 150° C. to obtain a negative electrode web. This negative electrode web was rolled by a roll press to produce a negative electrode in the form of a sheet composed of negative electrode mixed material layers (both sides) with a density of 1.8 g/cm$^3$ and the copper foil. The negative electrode in the form of a sheet was then cut into a width of 5.0 cm and a length of 52 cm to yield a negative electrode for a lithium ion secondary battery.

<Production of Lithium Ion Secondary Battery>

The positive electrode and the negative electrode produced as described above were wound around a 20 mm diameter core having a separator (fine porous membrane of polypropylene with a thickness of 15 µm) interposed therebetween to yield a wound body. The resultant wound body was compressed in one direction at a rate of 10 mm/second until a thickness of 4.5 mm is obtained. Note that the compressed wound body had an elliptical shape in plan view, and the ratio of the major axis to the minor axis (major axis/minor axis) was 7.7.

Further, an electrolyte solution (composition: $LiPF_6$ solution having a concentration of 1.0 M (the solvent is a mixture yielded by adding 5 mass % of the fluoroethylene carbonate to mixed solvent of ethylene carbonate/ethyl methyl carbonate in a 3/7 mass ratio, with an addition of 2% by volume of vinylene carbonate as an additive agent) was prepared.

After that, the compressed wound body was housed in an aluminum laminate case along with 3.2 g of an electrolyte solution. After connecting a nickel lead wire to a specific position of the negative electrode and connecting an aluminum lead wire to a specific position of the positive electrode, the opening of the case was thermally sealed to obtain a lithium ion secondary battery. This lithium ion secondary battery had a pouch-shape with a width of 35 mm, a height of 65 mm, and a thickness of 5 mm, and the nominal capacity of the battery was 700 mAh. The obtained lithium ion secondary battery was used to evaluate the battery resistance. Table 1 lists the results.

Example 2

A polymer, a binder composition for a positive electrode, a conductive material paste for a positive electrode, a slurry composition for a positive electrode, a positive electrode, a negative electrode, and a lithium ion secondary battery were produced in the same manner as in Example 1 except that diethylhydroxy amine was allowed to act instead of TEMPO at the point in time when the conversion ratio of the monomers to the polymer reached 85%. Each evaluation was performed in the same way as in Example 1. Table 1 lists the results.

Example 3

A polymer was obtained in the same manner as in Example 1, except that the amount of palladium acetate added as a hydrogenation reaction catalyst was adjusted so that the target polymer had the iodine value listed in Table 1. Using the resultant polymer, a binder composition for a positive electrode, a conductive material paste for a positive electrode, a slurry composition for a positive electrode, a positive electrode, a negative electrode, and a lithium ion secondary battery were prepared in the same manner as in Example 1. Each evaluation was performed in the same way as in Example 1. Table 1 lists the results.

Example 4

A polymer was obtained in the same manner as in Example 1, except that the amount of palladium acetate added as a hydrogenation reaction catalyst was adjusted so that the target polymer had the iodine value listed in Table 1. Using the resultant polymer, a binder composition for a positive electrode, a conductive material paste for a positive electrode, a slurry composition for a positive electrode, a positive electrode, a negative electrode, and a lithium ion secondary battery were prepared in the same manner as in Example 1. Each evaluation was performed in the same way as in Example 1. Table 1 lists the results.

Examples 5 to 6

A polymer, a binder composition for a positive electrode, a conductive material paste for a positive electrode, a slurry composition for a positive electrode, a positive electrode, a negative electrode, and a lithium ion secondary battery were produced in the same manner as in Example 1 except that the amount of t-dodecyl mercaptan added as a chain transfer agent was adjusted so that the target polymer had the weight-average molecular weight listed in the Table 1. Each evaluation was performed in the same way as in Example 1. Table 1 lists the results.

Example 7

A polymer, a binder composition for a positive electrode, a conductive material paste for a positive electrode, a slurry composition for a positive electrode, a positive electrode, a negative electrode, and a lithium ion secondary battery were produced in the same manner as in Example 1 except that PVDF was not used in preparation of the slurry composition for a positive electrode. Each evaluation was performed in the same way as in Example 1. Table 1 lists the results.

Examples 8 to 15

A polymer, a binder composition for a positive electrode, a conductive material paste for a positive electrode, a slurry composition for a positive electrode, a positive electrode, a negative electrode, and a lithium ion secondary battery were produced in the same manner as in Example 1 except that the blending amount of each monomer used in preparation of the polymer was changed as listed in Table 1. Each evaluation was performed in the same way as in Example 1. Table 1 lists the results.

Comparative Example 1

A polymer, a binder composition for a positive electrode, a conductive material paste for a positive electrode, a slurry composition for a positive electrode, a positive electrode, a negative electrode, and a lithium ion secondary battery were produced in the same manner as in Example 1 except that hydroquinone was allowed to act instead of TEMPO at the point in time when the conversion ratio of the monomers to the polymer reached 85%. Each evaluation was performed in the same way as in Example 1. Table 1 lists the results.

Comparative Example 2

To a reactor, 180 parts of deionized water, 25 parts of an aqueous solution of sodium dodecyl benzene sulfonate (concentration: 10%) as an emulsifier, 42 parts of styrene as an aromatic vinyl monomer, 4 parts of methacrylic acid as a carboxylic acid group-containing monomer, and 0.1 parts of t-dodecyl mercaptan as a chain transfer agent were charged in this order. Thereafter, gas inside the reactor was purged three times with nitrogen and then 54 parts of 1,3-butadiene was charged as a conjugated diene monomer. The reactor kept at 40° C. was charged with 0.3 parts of potassium persulfate as a polymerization initiator to initiate polymerization, and the polymerization was allowed to proceed while the solution was stirred. At the point in time when the conversion rate of the monomers to the polymer reached 95%, hydroquinone was allowed to act. The residual monomers were then removed with a rotary evaporator with a water temperature of 60° C., to thereby obtain a water dispersion of a target polymer.

Then, a binder composition for a positive electrode, a conductive material paste for a positive electrode, a slurry composition for a positive electrode, a positive electrode, a negative electrode, and a lithium ion secondary battery were produced in the same manner as in Example 1 except that water was used instead of NMP in the preparation of the binder composition for a positive electrode, and that neither PVDF nor NMP were used in the preparation of the slurry composition for a positive electrode. Each evaluation was performed in the same way as in Example 1. Table 1 lists the results. The weight-average molecular weight of the resulting polymer could not be measured because the polymer was insoluble to a solvent.

Comparative Example 3

To a reactor, 180 parts of deionized water, 25 parts of an aqueous sodium dodecyl benzene sulfonate solution (concentration: 10%) as an emulsifier, 42 parts of styrene as an aromatic vinyl monomer, 54 parts of 2-ethylhexyl acrylate, and 4 parts of methacrylic acid were charged in this order. Then, after gas inside the reactor was purged three times with nitrogen, the reactor kept at 40° C. was charged with 0.3 parts of potassium persulfate as a polymerization initiator to initiate polymerization. The polymerization was allowed to proceed while the solution was stirred.

At the point in time when the conversion rate of the monomers to the polymer reached 95%, hydroquinone was allowed to act, and then the residual monomers were removed with a rotary evaporator with a water temperature of 60° C., to thereby obtain a water dispersion of a target polymer.

Then, a binder composition for a positive electrode, a conductive material paste for a positive electrode, a slurry composition for a positive electrode, a positive electrode, a negative electrode, and a lithium ion secondary battery were produced in the same manner as in Example 1 except that water was used instead of NMP in the preparation of the binder composition for a positive electrode, and that neither PVDF nor NMP were used in the preparation of the slurry composition for a positive electrode. Each evaluation was performed in the same way as in Example 1. Table 1 lists the results. The weight-average molecular weight of the resulting polymer could not be measured because the polymer was insoluble to a solvent.

In Table 1 described below, "NMP" denotes N-methyl-2-pyrrolidone, "H-BD" denotes a hydrogenated 1,3-butadiene unit, "2EHA" denotes 2-ethylhexyl acrylate, and "BD" denotes a 1,3-butadiene monomer unit, and "PVDF" denotes a polyvinylidene fluoride. In addition, * indicates the binding site to the terminal of the main chain of the polymer.

Also in Table 1, "Str A", "Str B", and "Str C" indicate the following structures:

[Formula 1]

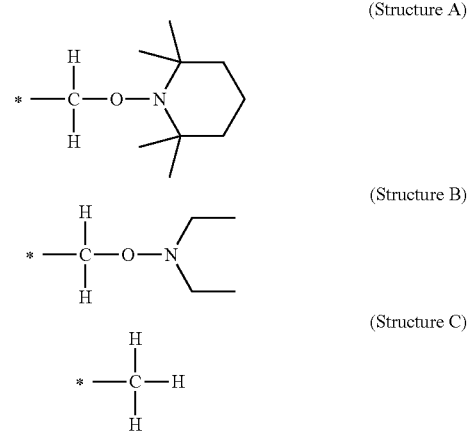

TABLE 1

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Binder Composition | Polymer | Structure at terminal of polymer | (Str A) | (Str B) |  |  |  | (Str A) |  |  |  |
|  |  | Weight-average molecular weight (Mw) | 50,000 | 50,000 | 50,000 | 50,000 | 180,000 | 380,000 | 50,000 | 50,000 | 50,000 |
|  |  | Aromatic vinyl monomer (wt %) | 43 | 43 | 43 | 43 | 43 | 43 | 43 | 37 | 49 |
|  |  | Nitrile group-containing monomer (wt %) | 23 | 23 | 23 | 23 | 23 | 23 | 23 | 29 | 17 |
|  |  | Carboxy group-containing monomer (wt %) | 4 | 4 | 4 | 4 | 4 | 4 | 4 | 4 | 4 |
|  |  | [Linear alkylene structural unit having carbon number of ≥ 4 (H-BD)] (wt %) | 28.8 | 28.8 | 28.8 | 28.8 | 28.8 | 28.8 | 28.8 | 28.8 | 28.8 |
|  |  | [Conjugated diene monomer unit (BD)] (wt %) | 1.2 | 1.2 | 1.2 | 1.2 | 1.2 | 1.2 | 1.2 | 1.2 | 1.2 |
|  |  | [Optional monomer (2EHA)] (wt %) | — | — | — | — | — | — | — | — | — |
|  |  | Filter passage flow rate (g/min) | 30 | 24 | 30 | 30 | 18 | 12 | 30 | 27 | 13 |
|  |  | Glass-transition temperature (° C.) | 20 | 20 | 20 | 20 | 20 | 20 | 20 | 21 | 19 |
|  |  | Iodine value (mg/100 mg) | 5.6 | 5.6 | 18.3 | 32 | 5.6 | 5.6 | 5.6 | 5.6 | 5.6 |
|  | Solvent | Type | NMP | NMP | NMP | NMP | NMP | NMP | NMP | NMP | NMP |
|  |  | Boiling point (° C.) | 204 | 204 | 204 | 204 | 204 | 204 | 204 | 204 | 204 |
|  | Other polymers |  | PVDF | PVDF | PVDF | PVDF | PVDF | PVDF | — | PVDF | PVDF |
|  | Percentage content [polymer:optional polymer (mass ratio)] |  | 4:96 | 4:96 | 4:96 | 4:96 | 4:96 | 4:96 | 100:0 | 4:96 | 4:96 |
| Evaluation | Dispersibility of conductive material |  | A | A | B | C | B | C | A | A | C |
|  | Flexibility of electrode |  | A | A | A | A | A | A | A | A | A |
|  | Battery resistance |  | A | A | A | B | A | B | C | B | B |

|  |  |  | Ex. 10 | Ex. 11 | Ex. 12 | Ex. 13 | Ex. 14 | Ex. 15 | Comp. Ex. 1 | Comp. Ex. 2 | Comp. Ex. 3 |
|---|---|---|---|---|---|---|---|---|---|---|---|
| Binder Composition | Polymer | Structure at terminal of polymer |  |  | (Str A) |  |  |  |  | (Str C) |  |
|  |  | Weight-average molecular weight (Mw) | 50,000 | 50,000 | 50,000 | 50,000 | 50,000 | 50,000 | 1,200,000 | — | — |
|  |  | Aromatic vinyl monomer (wt %) | 32 | 54 | 40 | 49 | 38 | 52 | 43 | 42 | 42 |
|  |  | Nitrile group-containing monomer (wt %) | 34 | 12 | 26 | 23 | 23 | 23 | 23 | — | — |
|  |  | Carboxy group-containing monomer (wt %) | 4 | 4 | 4 | 4 | 4 | 4 | 4 | 4 | 4 |
|  |  | [Linear alkylene structural unit having carbon number of ≥ 4 (H-BD)] (wt %) | 28.8 | 28.8 | 28.8 | 23 | 33.6 | 20.2 | 28.8 | — | — |

TABLE 1-continued

|  |  |  |  |  |  |  |  |  |  |  |
|---|---|---|---|---|---|---|---|---|---|---|
|  | [Conjugated diene monomer unit (BD)] (wt %) | 1.2 | 1.2 | 1.2 | 1 | 1.4 | 0.8 | 1.2 | 54 | — |
|  | [Optional monomer (2EHA)] (wt %) | — | — | — | — | — | — | — | — | 54 |
|  | Filter passage flow rate (g/min) | 28 | 7 | 17 | 19 | 18 | 15 | 2 | 38 | 38 |
|  | Glass-transition temperature (° C.) | 22 | 18 | 13 | 32 | 9 | 42 | 20 | −21 | −8 |
|  | Iodine value (mg/100 mg) | 5.6 | 5.6 | 5.6 | 4.5 | 6.5 | 4 | 5.6 | 253 | 0 |
| Solvent | Type | NMP | NMP | NMP | NMP | NMP | NMP | NMP | Water | Water |
|  | Boiling point (° C.) | 204 | 204 | 204 | 204 | 204 | 204 | 204 | 100 | 100 |
|  | Other polymers | PVDF | PVDF | PVDF | PVDF | PVDF | PVDF | PVDF | — | — |
|  | Percentage content [polymer:optional polymer (mass ratio)] | 4:96 | 4:96 | 4:96 | 4:96 | 4:96 | 4:96 | 4:96 | 100:0 | 100:0 |
| Evaluation | Dispersibility of conductive material | A | C | B | B | B | B | D | D | D |
|  | Flexibility of electrode | A | A | A | B | A | C | A | D | D |
|  | Battery resistance | B | C | B | B | B | C | D | D | D |

It can be seen from Table 1 that favorable dispersions of the conductive materials was achieved, and accordingly the secondary batteries having reduced battery resistances and excellent output characteristics were obtained in Examples 1 to 15 in which the binder compositions for a positive electrode comprising the polymers each having a structure represented by Formula (I) at its terminal, were used.

In contrast, it can be seen from Table 1 that favorable dispersions of the conductive materials could not be achieved, and accordingly the battery resistances of the obtained secondary batteries increased in Comparative Examples 1 to 3 in which the binder compositions for a positive electrode containing the polymers each not having a structure represented by Formula (I) at its terminal, were used.

INDUSTRIAL APPLICABILITY

According to the present disclosure, it is possible to provide a binder composition for a secondary battery which enables favorable dispersion of a conductive material when used in preparation of a slurry composition for a secondary battery electrode.

Moreover, according to the present disclosure, it is possible to provide a conductive material paste for a secondary battery electrode and a slurry composition for a secondary battery electrode in which a conductive material is favorably dispersed.

Furthermore, according to the present disclosure, it is possible to provide an electrode for a secondary battery which enables sufficient improvement in battery characteristics of a secondary battery, and a secondary battery having excellent battery characteristics such as output characteristics.

The invention claimed is:

1. A binder composition for a secondary battery comprising:
a polymer having a structure represented by the following formula (I) at a terminal thereof;

[Formula 1]

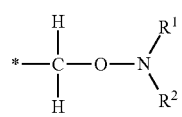

where $R^1$ and $R^2$ each independently represents an organic group or an organic group in which $R^1$ and $R^2$ together form a ring, and * represents a binding site to the terminal of a main chain of the polymer; and
a solvent, wherein
the polymer represented by the formula (I) contains a straight chain alkylene structural unit having a carbon number of at least 4.

2. The binder composition for a secondary battery according to claim 1, wherein the polymer has a weight-average molecular weight of more than 10,000 and 500,000 or less.

3. The binder composition for a secondary battery according to claim 1, wherein
a filter passage flow rate of an N-methyl-2-pyrrolidone solution of the polymer (I) determined according to the following equation is 5 g/min or more when 3 g of the N-methyl-2-pyrrolidone solution of the polymer (I) is made to pass through a filter having a diameter of 25 mm and a pore diameter of 0.5 μm at a temperature of 25° C. under a pressure of 0.4 kgf/cm², the N-methyl-2-pyrrolidone solution of the polymer (I) being prepared so as to have a solid content of 2 mass %, Filter passage flow rate=3/T (g/min)

[wherein T represents time (in minute) until 3 g of the N-methyl-2-pyrrolidone solution of the polymer completes to pass through].

4. The binder composition for a secondary battery according to claim 1, wherein the polymer comprises an aromatic vinyl monomer unit.

5. The binder composition for a secondary battery according to claim 4, wherein a percentage content of the aromatic vinyl monomer unit in the polymer is more than 30 mass % and 55 mass % or less.

6. The binder composition for a secondary battery according to claim 1, wherein the polymer has a glass-transition temperature of higher than 5° C. and 45° C. or lower.

7. A conductive material paste for a secondary battery electrode comprising:
the binder composition for a secondary battery according to claim 1; and
a conductive material.

8. A slurry composition for a secondary battery electrode comprising:
the binder composition for a secondary battery according to claim 1;
an electrode active material; and
a conductive material.

9. A method of producing the slurry composition for a secondary battery electrode according to claim 8, comprising:
a first step of mixing the conductive material, the polymer, and the solvent to obtain a conductive material paste; and a second step of mixing the conductive material paste and the electrode active material.

10. An electrode for a secondary battery comprising an electrode mixed material layer formed using the slurry composition for a secondary battery electrode according to claim 8.

11. A secondary battery comprising the electrode for a secondary battery according to claim 10.

* * * * *